United States Patent [19]

Petty, Jr.

[11] Patent Number: 5,107,518
[45] Date of Patent: Apr. 21, 1992

[54] LOCKUP PREVENTION METHOD AND APPARATUS

[75] Inventor: John S. Petty, Jr., Durham, N.C.

[73] Assignee: International Business Machines Corporation, Armonk, N.Y.

[21] Appl. No.: 517,100

[22] Filed: May 1, 1990

[51] Int. Cl.$^5$ .................... H04L 27/10; H04L 1/14
[52] U.S. Cl. ........................ 375/8; 375/121; 379/98; 371/34
[58] Field of Search ............... 375/3.1, 7, 8, 10, 121; 370/13, 13.1, 15; 379/5, 8, 93, 97, 98; 371/20.1, 20.4, 20.5, 32, 34; 178/4.1 C

[56] References Cited

U.S. PATENT DOCUMENTS 4,271,513  6/1981  Maejima et al. ............. 371/20.5
4,440,988  4/1984  Heatherington ............. 379/98
4,675,862  6/1987  Banzi, Jr. et al. ............ 371/20.5

Primary Examiner—Benedict V. Safourek
Attorney, Agent, or Firm—Edward H. Duffield

[57] ABSTRACT

Lockup in escaped mode for asynchronous paired modems on a communications link utilizing DTE echo back verification protocol is prevented by adding logic to each modem to detect and suppress transmission by the modem to its paired modem of at least one of any escape sequence characters received by a modem from its attached DTE. This prevents the unintentional placement of the paired modem, which would otherwise be transmitting echoed back characters from its DTE, from entering into the escape mode of operation due to what it would recognize as "escape sequence" characters received as "echo back" verification from its DTE.

10 Claims, 3 Drawing Sheets

LOCKUP PREVENTION METHOD AND APPARATUS

FIELD OF THE INVENTION

This application relates to asynchronous modems used in data communication systems in general and particularly to designs for such modems which are based upon microprocessor control of the modem's functions.

BACKGROUND PRIOR ART

Modems themselves are, of course, widely known and used to facilitate the transmission of digital signals over analog telephone lines by modulating the digital signals onto an analog signal at the transmitter and demodulating the received signal and decoding the appropriate digital significance at the receiver. The name "modem" is thus an abbreviation for the modulation-demodulation process carried out by a pair of modems communicating over an analog transmission line.

As is also well known, modems operate in pairs and may operate with synchronous or asynchronous DTEs. Synchronous modems generally are reserved for higher speeds and operate with block or periodic error checking protocols for detecting erroneous reception of transmitted characters or digital data. Asynchronous modems, in contrast, are often operated in the "echo back" mode of operation in which the receiving modem's attached data terminal equipment will transmit back over the line a received character to indicate to the transmitter what character has been received and that it has been received. While this mode of operation is inefficient, it is simple and is widely employed or even required as a discipline in various data terminal equipment (DTE) manufacturer's devices.

As modem designs have progressed over the years, wide-spread use has occurred of microprocessor-based logic and filtering mechanisms that employ algorithms instead of physical analog circuits. Such modem designs have appeared in numerous patents. For example, U.S. Pat. No. 4,549,302 shows the typical design of one such modem utilizing a microprocessor, onboard RAM, addressable registers for interfacing to various circuits and functions and a full complement of filtering, tuning and conversion operations for handling the signals coming to or for transmitting signals from the modem to the communication line over the RS232 interface or port to the attached data terminal equipment (DTE).

In fact, the modems have progressed to the point that they may receive and act upon commands directed to them by the DTE. In order to obtain a response from the modem it has been generally required that the modem receive an inband signal in the form of a special header or escape sequence which alerts the modem to the fact that any following characters or commands are intended for it instead of for transmission on the communication line. Indeed, the aforementioned U.S. Pat. No. 4,549,302 is itself directed to a method of correctly recognizing an escape sequence of characters and distinguishing such a sequence from the random occurrence of a sequence of similar appearance that might occur in the data stream. In general, the modem monitors for the occurrence of escape characters in a sequence which includes some periods of time in which no characters are received, i.e. a pause, followed by the receipt of characters which may or may not be followed by another pause. The presence of the pauses distinguishes an intentional occurrence of an escape sequence of characters from an unintentional or randomly occurring one embedded in a stream of data.

However, in an asynchronous modem system, there does exist a significant problem where the sending and receiving DTE's echo received characters for error detection back to their transmitting partner in order to signal reception of a previous character and to indicate what character was understood to be received. This echoing of characters can cause a unique lockup problem to occur in asynchronous modems. Assume that an escape sequence is being transmitted by a first DTE through a modem attached to it in order for the DTE to gain control over the modem's functions. The modem will receive the first character, examine it, determine that it is potentially an escape sequence character and transmit it. It will be received at the remote modem, demodulated, passed over the RS232 interface to the attached DTE and echoed back through the receiving modem to be retransmitted. Of course, the remote modem receiving such a character from its attached DTE will begin to examine the characters that follow to see if an escape sequence is intended. The net result of this form of operation is that, in echo back mode, the remote asynchronous modem will see the same sequence of one or more escape characters and pauses seen by the attached local modem from the DTE which is actually trying to control only the local modem. The echo back feature from the remote DTE to its attached modem will cause the remote modem to enter into the "escaped" mode, awaiting receipt of commands from its DTE. However, the remote DTE does not intend to command or control its modem in this scenario, and the remote modem remains locked to incoming or outgoing data transmission while it patiently awaits commands over its RS232 interface.

OBJECTS OF THE INVENTION

In view of the foregoing known difficulties with asynchronous, echo mode modem systems, it is an object of this invention to provide an improved control method and apparatus that prevent the lockup problem from occurring.

SUMMARY

The foregoing and still other objects not specifically enumerated, are met in the preferred embodiment of the invention. Such an embodiment is described herein by implementing in the transmit logic and buffer section for each modem additional logic or software processes executed by the microprocessor. This additional logic will detect the fact that an escape sequence is being received from an attached DTE and will block the transmission on its outgoing line to the communication system of one or more of the escape sequence characters. This prevents the remote receiving modem and its DTE from entering into an escaped mode waiting for commands. Verification logic is included in each of these improved modems to assure that a true escape sequence has been received. Briefly, each character arriving from a DTE is checked by the modem to determine if it is an escape character. If it is not an escape character it is merely transmitted to the telephone line in the normal manner. However, if an escape character is received, and if the validating conditions such as the preliminary pause of sufficient time which identifies the onset of an escape sequence has been detected and if a sufficient number of the escape characters has been detected and counted, the final such character received will be held in a register and discarded when the escape mode is entered. This character will thus not be transmitted to the remote modem. Thus, detection of the receipt of an escape sequence character is utilized to block transmission of the character to the remote modem in the broadest sense of the invention.

BRIEF DESCRIPTION OF DRAWING

The invention will further be described with reference to a preferred embodiment thereof which is further illustrated and explained with reference to the drawing in which.

DESCRIPTION OF PREFERRED EMBODIMENT

Figure 1:
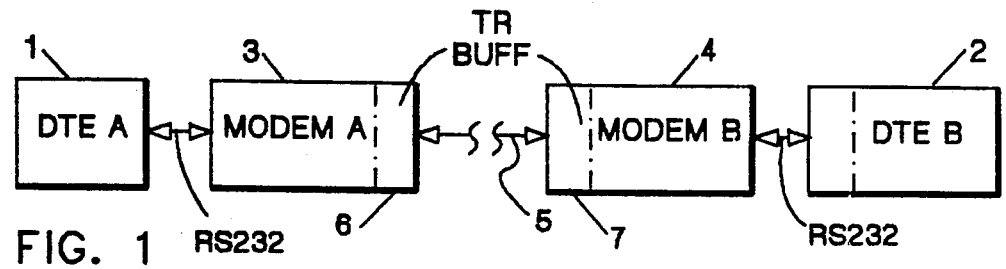
FIG. 1 illustrates schematically a typical modem-based data communication link between a local DTE and a remote DTE over a telecommunication line.

Turning to FIG. 1, a typical telecommunications link between two DTE's 1 and 2 over a telephone line 5 is facilitated by modems 3 and 4. Each modem includes a transmission buffer 6 or 7 as shown, a microprocessor, random access memory (RAM) and various registers, filters, switches and conversion devices for receiving digital characters from its attached DTE 1 or 2, converting them into an analog modulated form and placing the result on the telecommunications line 5 or, conversely, receiving analog information from the telecommunications line 5, demodulating and decoding the signal and presenting digital signals over the RS232 interface to the attached DTE 1 or 2.

All of the various details of such a modem are well known to those of skill in the art and reference may be had to U.S. Pat. No. 4,549,302 which shows a specific example of such a modem architecture including the modifications referred to earlier for detecting a valid escape sequence by instituting a mechanism and logic for detecting not only the valid escape characters but validation pauses which may be bracketed around the characters in the transmission sequence. None of this will be described in full detail inasmuch as it is a part of the prior art and does not form a specific part of the present invention.

Figure 2:
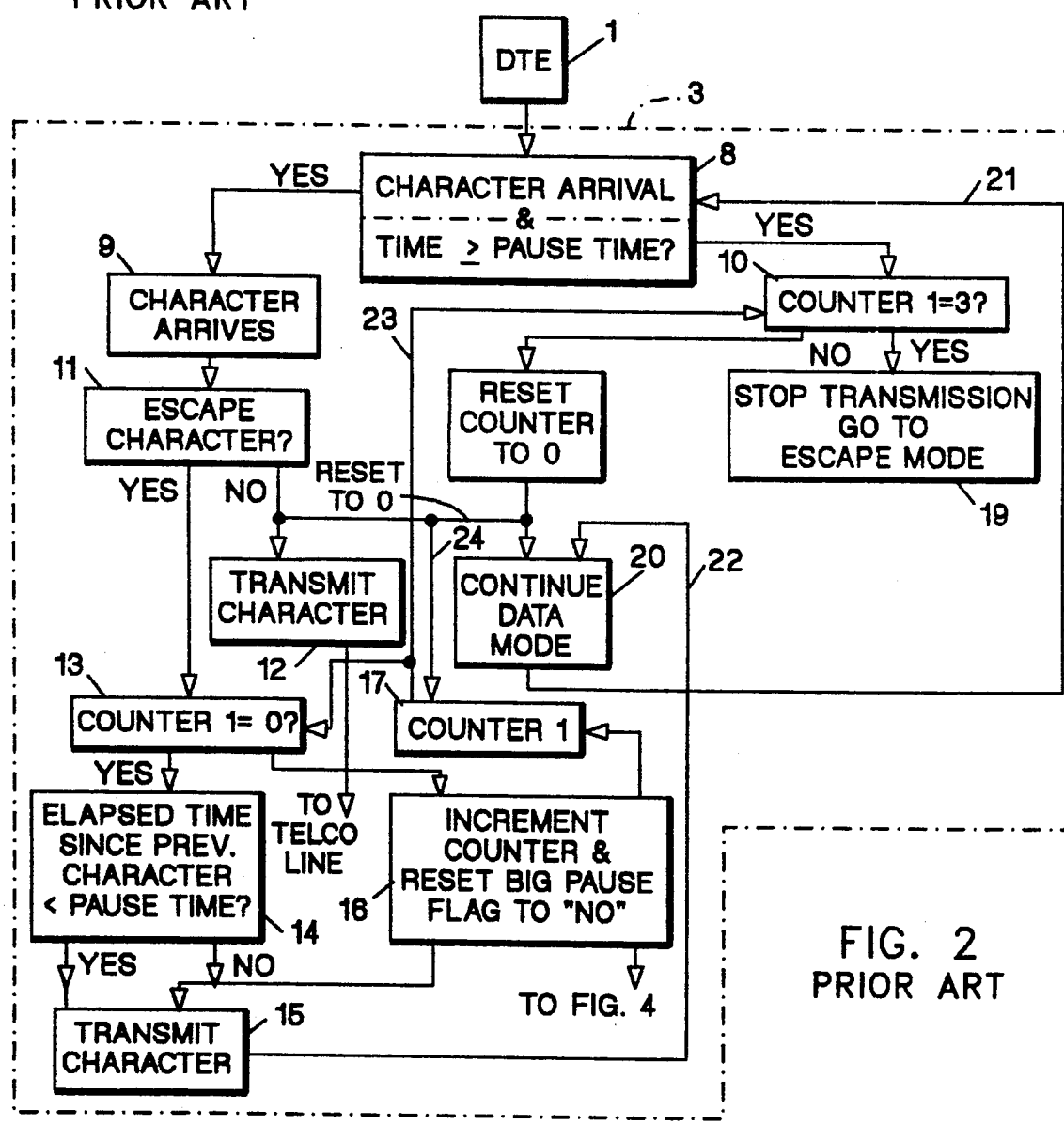
FIG. 2 illustrates the typical escape sequence detection apparatus and method employed in the prior art modems which give rise to the asynchronous echo mode lockup problem.

FIG. 2, however, is added to fully explain the difficulty that is encountered in the prior art with typical, asynchronous mode echo back operation utilizing modems of the sort known in the prior art.

In FIG. 2 the DTE 1 presents information to the modem, typically over the international standard EIA232 digital interface. Modem 3 is shown within the dotted box, in FIG. 2, but only those portions which are necessary for detecting and validating the reception of an escape sequence are shown, all other physical and operational functional elements being eliminated for sake of clarity.

In FIG. 2, the processes conducted at the modem 3 which receives an escape sequence of characters arriving from its attached DTE 1 are shown. These processes logically examine the data flow and are conducted in the microprocessor in the preferred embodiment. The logic flow and functions to be performed are described in detail in FIG. 2.

In box 8, the modem awaits arrival of a character from the DTE 1 and checks for whether the elapsed time interval between the receipt of the most recent character and that which preceded it is greater than or equal to a predefined pause time. It is the pause time which validates the fact that an escape sequence is being transmitted by the DTE 1. When a character arrives, its arrival is noted in block 9 and the character is compared on block 11 against stored codes to identify it as an escape character. If the character is not an escape character, it is simply transmitted as shown by block 12 over the telephone line 5 in a continuation of the "data mode" of operation. This normal mode is to be contrasted with the control or "escaped" mode of operation. This is shown by the linkage between the output of block 11 which is connected to blocks 20 and 17.

Another output from block 8 is the elapsed time indication. Whenever an internal timer (shown later) within block 8 detects that the elapsed time between the receipt of a character and the next most recently received character is greater than or equal to a predefined pause time used to validate escape sequences, a signal is generated. A positive indication on the signal output from block 8 is fed to a comparison block 10 which determines whether the content of a counter 17 has been incremented to a value of three in this example, where three is the number of occurrences of an escape character that are required in order to have a valid escape sequence. It will be noted that if the counter value equals 3 in block 10, the yes output goes to block 19 to stop transmission by the modem and enter into the escape mode of operation in which the modem awaits a command. However, the character which was received will have already been transmitted over the telecommunications line as will be seen shortly.

Assuming that an escape character, for example the first escape character to be identified, is found in block 11, a comparison is made in block 13 to determine if the contents of the counter is equal to 0. Presuming this is the first escape character, the contents of the counter 1 in block 17 will be 0. Thus a positive output will be provided to block 14 which checks for whether the elapsed time since the receipt of the previous character is less than the appropriate pause time, i.e. a check is made to determine if this would merely represent the occurrence in a data stream of an escape sequence character since an appropriate pause has not been received. If the "yes" output is provided, the character is transmitted as shown in block 15 and data mode is continued as shown by the connection over line 22 to block 20 and its connection over line 21 back to block 8. However, if the result of the test in block 14 is negative, i.e. the pause time may have been reached, the character is still transmitted as shown by the connection of the "no" output in block 15. However, by block 16, the counter 1 in block 17 is caused to be incremented by one and a pause flag (in another figure) is set to "no" as indicated in block 16 in FIG. 2. The counter is not reset to 0 by block 18 unless the result of the pause time comparison is positive and the contents of the counter are not equal to 3. This eliminates the potential erroneous detection of an escape sequence when the pause between escape sequence characters is greater than or equal to the pause time that is supposed to precede the first escape character and follow the last escape character. Counter 1 is reset thusly if either no escape character is detected or, if even though an escape character is detected, the period of time following the receipt of the escape character and the next escape character is also greater than the pause time, which would constitute an invalid escape sequence.

A valid escape sequence will result in the escape character being detected three times in sequence in block 11 and counter 1 in block 17 being incremented to a count of 3 and supplied to block 10 where, when the pause time following the third or last escape character is found to be met, a true output will be reached from block 10 and transmission will be stopped in block 19. This will not, however, be before the final escape character was transmitted as the result of the checks made in block 14 and block 15. Thus, when a valid escape sequence is received by a modem 3, it will transmit the characters on the communication line 5 and will eventually, in echo back mode, result in the modem 4 at the remote end receiving from its attached DTE2 the echoed back escape sequence. This will trigger modem 4 into going into the escape mode to await control commands which will, of course, not be forthcoming. The lockup condition will thus exist for which the only remedy is to call up a remote terminal operator on another telephone line and direct the resetting of the remote modem 4. This is both cumbersome and, as will be apparent, inconvenient and time-consuming.

Figure 3:
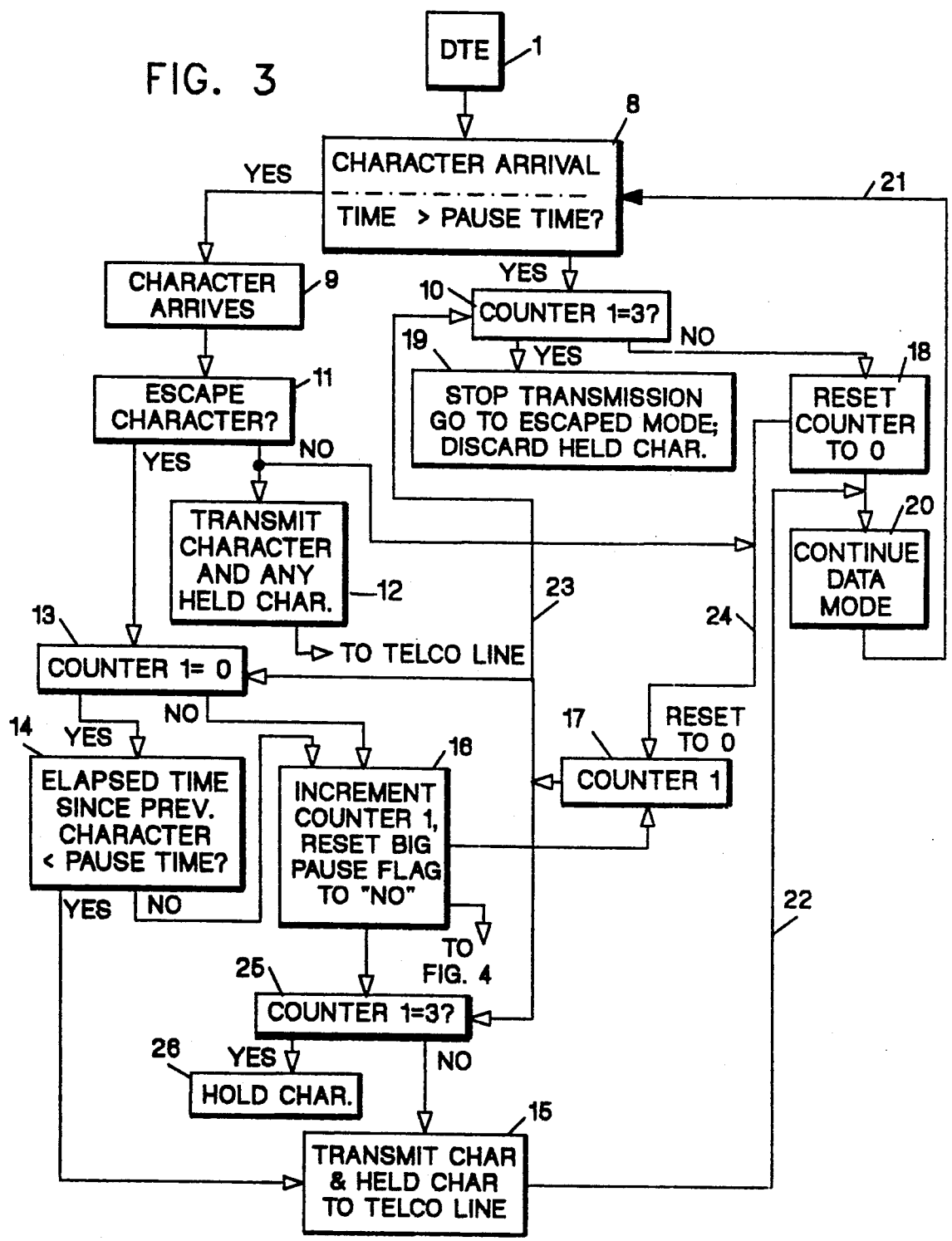
FIG. 3 illustrates a preferred embodiment of the present invention with the additional logic and process functions necessary to alleviate the lockup problem included.

Turning to FIG. 3, a preferred embodiment of the present invention is illustrated. Like numerals are utilized for similar boxes and functions to those shown in FIG. 2. It will be noted that block 12 causes the transmission received and of any character that has been held previously. This refers to the new block 26 and the new comparison in block 25 which have been implemented in the preferred embodiment. The flow of operations is nearly the same as that with FIG. 2; however, a significant difference exists.

In FIG. 3, an inquiry is made at the output of block 16 which was not made in FIG. 2. Namely, the content of the counter 1 in block 17 is checked for whether it is equal to 3 or not. If it is, a valid escape sequence has been detected and the final character is held in a register 26 and not sent to block 15 for transmission on the telephone line. This prevents the transmission of the final character in the escape sequence once the escape sequence has been detected as a valid escape sequence and prevents the problem with causing the remote modem 4 to go into lockup or escape mode as noted previously. Block 19 in FIG. 3 is also modified since, when a valid escape sequence is detected, transmission is stopped and escape mode is entered as before but the character held in the register 26 is also discarded. Remaining features and operation of the circuitry and processes shown in FIG. 3 remain logically the same as in FIG. 2.

Figure 4:
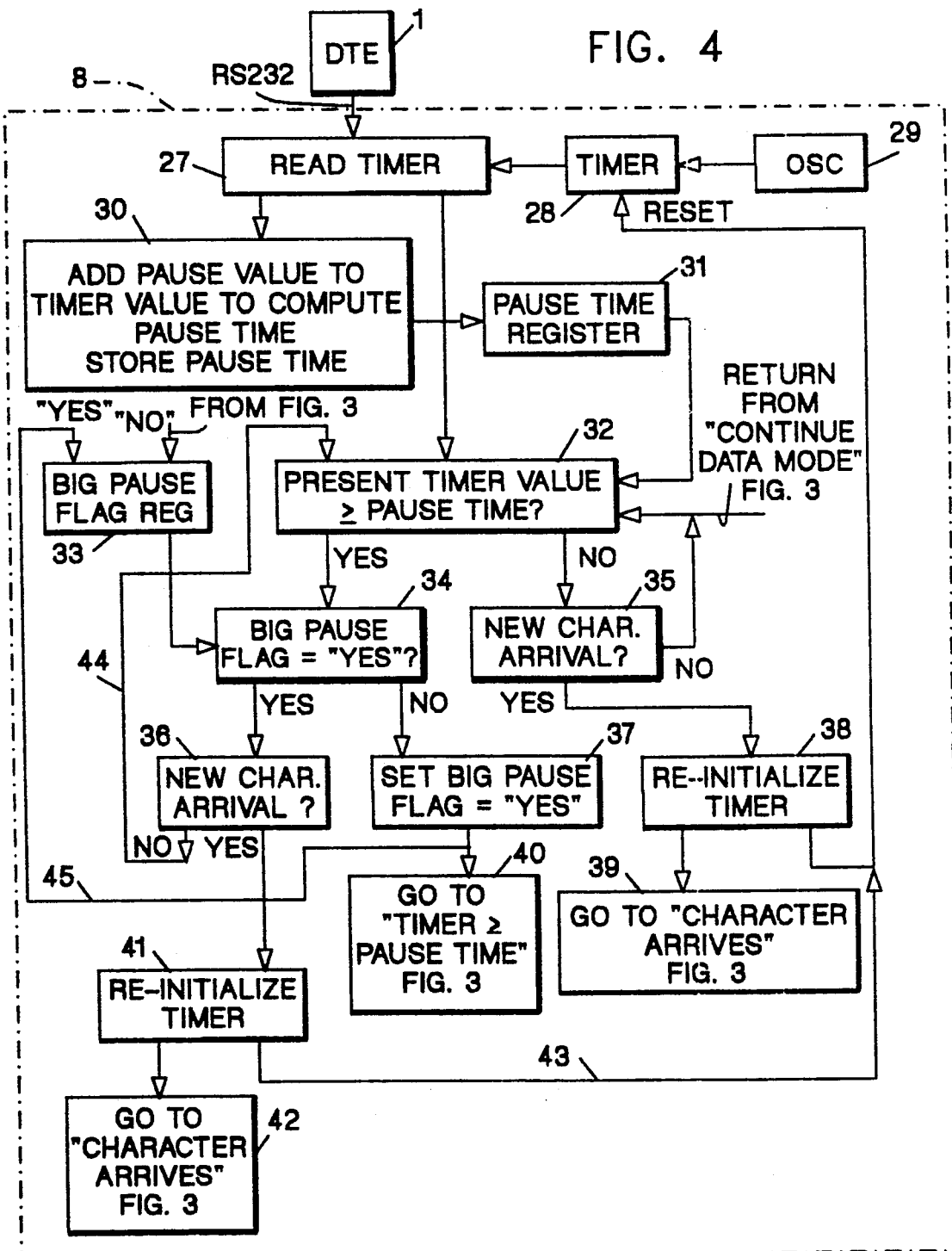
FIG. 4 illustrates in greater detail the process steps to be carried out in the preferred embodiment in order to effectively prevent the lockup problem.

FIG. 4 illustrates in greater detail some of the elements that are contained in block 8 in FIGS. 2 and 3 together with additional logical processes of the preferred embodiment utilized to implement the control as shown in FIG. 3.

The DTE1 provides its output over the RS232 interface to the input of a modem where a timer value is read in block 27. The timer 28 is driven by an oscillator 29 and is a freerunning counter, for example, of the sort that is usually used in clocking functions and is shown in the noted prior art. The output of the timer value in block 27 is added to a prescribed pause value in block 30 to compute the time that will be required to identify the onset or end of an escape sequence. This value is stored as the "pause time" value in the pause time register 31. The timer value from block 27 is also compared with the content of the pause time register 31 to determine if the present timer value is greater than or equal to the pause time. If the answer is "yes", a flag register 34, typically a 1-bit register or 1-bit in dedicated memory, is set to a "yes" condition as shown in block 34. If the timer value is not yet equal to the pause time, the negative output is applied to block 35 which, if a new character has arrived, causes reinitializing of the timer by the process step in block 38 and the connection from its output over line 43 to the timer 28. The process continues by going to the character arrival block in FIG. 3 as shown by block 39. If no new character has arrived, the output of block 35 returns to the comparison block 32 and data mode continues. If the output of the comparison in block 32 is "yes", a comparison in block 34 is made to determine if the pause flag register 33 is set to a "yes" condition. If it is, and a new character has arrived as shown in block 36, the timer is reinitialized by the output of block 41 over line 43 and operation continues at the "new character arrives" block in FIG. 3 as shown. However, if the pause flag is not set to a "yes" condition, it will be set to the "yes" condition in block 37 and processes continue as shown in block 46 by going back to the pause time comparison in FIG. 3. Also the pause flag register 33 is set to a "yes" condition over line 45 as shown.

It will thus be seen that what is illustrated in FIG. 4 is actually all of the logical processes involved in block 8 as shown in FIGS. 2 and 3, particularly with reference to its cooperation with FIG. 3 for the preferred embodiment.

In the preferred embodiment, all of the process steps may be implemented in microprocessor instruction routines to be handled by the microprocessor within the modem. Normal functions of counting, accumulating, comparing, decision events and energizing of signaling lines are all well known microprocessor functions and may be easily implemented in any given microprocessor when the machine control process instruction set is known. This is easily within the skill of any person in the art having such a device and hence the process steps and functions as shown in the flowcharts of FIGS. 3 and 4 are deemed fully adequate to inform one of ordinary skill in the art how to build an operating example of the preferred embodiment.

As will be obvious to those of skill in the art, the invention may also be easily realized in hardware logic circuits fulfilling the same functions as the flow and logic diagrams in FIGS. 3 and 4, the choice of which form of embodiment is selected being primarily one of convenience and cost. In the current environment, convenience and cost dictate the realization of the preferred embodiment in the form of microcode process routines to be carried out by the microprocessor in the modem.

Having described my invention with reference to the preferred embodiment thereof and having described the best mode contemplated for carrying out the invention, what is desired to be protected by letters patent is set forth in the claims appended hereto by way of example and not by way of limitation.

Therefore what is claimed is:

1. In a local modem to remote modem communication link, a method of preventing lockup of remote asynchronous modems when an escape sequence from a local DTE is transmitted from a transmitting local modem to a remote modem having a DTE operating in an echo back mode of operation, comprising the steps of:

detecting at said transmitting modem the receipt from the attached DTE, of an escape sequence character; and blocking transmission of said character on said modem to modem communication link.

2. A method as described in claim 1, wherein:

said step of detecting includes steps of counting sequential receipt from the DTE of escape characters until a count of n, where n is an integer representing the number of escape characters required in a valid escape sequence, is reached, followed by said blocking step.

3. A method as described in claim 2, further comprising a step of:

said blocking transmission step including blocking only the transmission of said nth escape character.

4. A method as described in claim 1 or 2 or 3 wherein:

said detecting receipt of an escape sequence character includes steps of comparing received characters to known escape character codes and examining the elapsed time interval between the receipt of each escape character and the characters preceding the first such escape character and the interval following the nth said escaped character to determine that a pause at least equal to a prescribed pause time exists for each said elapsed time interval.

5. A method as described in claim 4, wherein:

said elapsed time comparison is also conducted on the time intervals between said escape sequence characters with the requirement that a valid escape sequence have elapsed time intervals between escape sequence characters of less than said prescribed pause time.

6. A method of preventing lockup of asynchronous modem links during echo back mode of operation when an escape command sequence is received from its DTE by the transmitting modem, comprising steps at the transmitting modem in a transmitter-receiver modem link of:

measuring the elapsed time intervals between consecutively received characters received from said DTE;

examining each said received character to determine whether it is an escape sequence character; and blocking transmission by said modem on to said link of the said most recently received character if said character is an escape sequence character and said elapsed time interval between the receipt of said character and the character previous thereto is greater than or equal to a prescribed time period.

7. A method as described in claim 6, further including steps of:

incrementing a counter if said character is an escape sequence character and said elapsed time interval between the receipt of said character and the character next previous to it is greater than or equal to said prescribed time interval; and comparing the count in said counter to a prescribed value n where n is an integral number equal to the number of consecutive occurrences of said escape character necessary to constitute a valid escape sequence; and blocking transmission of the most recently received said escape character if said counter value is equal to said prescribed integral number n.

8. An asynchronous modem comprising:

a first timer means for measuring elapsed time intervals between consecutive characters received from a DTE for transmission;

first comparison means for examining each said received character to determine by a true result of said comparison whether said character is an escape sequence character; and means for blocking transmission by said modem onto a communications link of said received and determined escape sequence character if said elapsed time interval is greater than or equal to a prescribed time.

9. Apparatus as described in claim 8, further comprising:

counting means connected to receive the output of said first comparison means for counting the number of true comparisons found by said comparison means; and second comparison means for comparing the count of said counter to a prescribed integral value n where n equals the number of consecutive occurrences of said escape character necessary to constitute a valid escape sequence.

10. Apparatus as described in claim 9, further comprising:

comparison means connected to said counter means and to said blocking means to control the blocking of transmission on said communication link of said most recently received escape sequence character only when the value of said counter equals said integral value n.

* * * * *